(12) United States Patent
Pampati et al.

(10) Patent No.: US 11,533,622 B2
(45) Date of Patent: Dec. 20, 2022

(54) QUARANTINING FAKE, COUNTERFEIT, JAILBROKE, OR ROOTED MOBILE DEVICES IN THE CLOUD

(71) Applicant: Zscaler, Inc., San Jose, CA (US)

(72) Inventors: Sreedhar Pampati, Union City, CA (US); David Creedy, Union City, CA (US); Brijesh Singh, Mohali (IN)

(73) Assignee: Zscaler, Inc., San Jose, CA (US)

( * ) Notice: Subject to any disclaimer, the term of this patent is extended or adjusted under 35 U.S.C. 154(b) by 189 days.

(21) Appl. No.: 16/426,249

(22) Filed: May 30, 2019

(65) Prior Publication Data

US 2020/0336913 A1 Oct. 22, 2020

(30) Foreign Application Priority Data

Apr. 17, 2019 (IN) .............................. 201911015402

(51) Int. Cl.
| | | |
|---|---|---|
| H04W 12/12 | (2021.01) | |
| H04W 12/122 | (2021.01) | |
| H04L 12/46 | (2006.01) | |
| H04L 9/40 | (2022.01) | |

(52) U.S. Cl.
CPC ....... *H04W 12/122* (2021.01); *H04L 12/4641* (2013.01); *H04L 63/0876* (2013.01); *H04L 63/1408* (2013.01)

(58) Field of Classification Search
CPC . H04W 12/12; H04W 12/126; H04W 12/128; H04W 12/30; H04W 12/122; H04L 12/4641; H04L 63/0876; H04L 63/1408; G06Q 30/0185; G06Q 30/018
See application file for complete search history.

(56) References Cited

U.S. PATENT DOCUMENTS

| | | | | |
|---|---|---|---|---|
| 9,769,671 | B1* | 9/2017 | Obaidi .................. | H04W 12/12 |
| 2012/0240183 | A1* | 9/2012 | Sinha .................. | H04L 63/1425 |
| | | | | 726/1 |
| 2014/0150049 | A1* | 5/2014 | Kwon .................. | H04W 12/08 |
| | | | | 726/1 |
| 2014/0365782 | A1* | 12/2014 | Beatson ................ | H04L 9/3231 |
| | | | | 713/186 |
| 2017/0154343 | A1* | 6/2017 | Kozlowski ......... | G06Q 30/0185 |
| 2018/0013779 | A1* | 1/2018 | Aguayo Gonzalez ... | G09C 1/00 |
| 2020/0104144 | A1* | 4/2020 | Walker ................ | G06F 3/04842 |

OTHER PUBLICATIONS

Itu, EUIPO European Union Intellectual Property Office, The Economic Cost of IPR Infringement in the Smartphones Sector, Feb. 2017, pp. 1-12.

\* cited by examiner

*Primary Examiner* — Richard A McCoy
(74) *Attorney, Agent, or Firm* — Clements Bernard Baratta; Lawrence A. Baratta, Jr.; Ryan Odessa (57) ABSTRACT

Systems and methods include, in a cloud node executing a security service, causing a mobile device to perform a validation check to determine if the mobile device is any of fake, counterfeit, jailbroken, and rooted; responsive to successful validation, allowing traffic to and from the mobile device through the security service; and responsive to unsuccessful validation, preventing traffic to and from the mobile device through the security service. The systems and methods can further include, prior to the causing, requiring the mobile device to install and launch an application, wherein registration with the security service requires the application; and performing the validation check via the application and a fake check service.

20 Claims, 7 Drawing Sheets

QUARANTINING FAKE, COUNTERFEIT, JAILBROKE, OR ROOTED MOBILE DEVICES IN THE CLOUD

FIELD OF THE DISCLOSURE

The present disclosure relates generally to mobile device and networking systems and methods. More particularly, the present disclosure relates to systems and methods for quarantining fake, counterfeit, jailbroke, or rooted mobile devices in the cloud.

BACKGROUND OF THE DISCLOSURE

The number of devices including mobile devices that connect to the Internet and enterprise networks is exploding. Also, the distinction between private networks (enterprise networks) and the Internet is becoming blurred as fast wireless access (e.g., 5G) and Bring Your Own Device (BYOD) proliferates. Even further, users can use Virtual Private Networking (VPN) or the like to access enterprise networks. Simply put, there is a tremendous number of mobile devices that are on or have access to secure resources on enterprise networks. The conventional endpoint security approach fails to provide security due to the lack of a network perimeter. Thus, there is a requirement to protect the enterprise from mobile devices. With the proliferation of mobile devices, there is also a proliferation of so-called counterfeit or fake mobile devices. As described herein, a counterfeit or fake mobile device is one that purports to be a specific brand, but is not, and is manufactured by a third-party which passes off the device as an actual branded device. As some mobile operating systems, e.g., Android, are open source, it is possible for malicious manufacturers to pass off counterfeit or fake devices as real devices. For example, there are a number of counterfeit Android devices manufactured, where they look and feel like a standard Samsung or other manufacturer devices but sold for a lot cheaper. A study by the EU Intellectual Property Office (EU IPO) in 2017 estimates there are 180 million counterfeit mobile devices. See Wajsman, N., and C. Burgos, "The economic cost of IPR infringement in the smartphones sector," EUIPO report (2017), the contents of which are incorporated by reference herein.

Disadvantageously, fake mobile devices typically get preloaded with malware and can do significant damage, once the user starts using, including damage to an enterprise network.

BRIEF SUMMARY OF THE DISCLOSURE

In an embodiment, a method includes, in a cloud node executing a security service, causing a mobile device to perform a validation check to determine if the mobile device is any of fake, counterfeit, jailbroken, and rooted; responsive to successful validation, allowing traffic to and from the mobile device through the security service; and, responsive to unsuccessful validation, preventing traffic to and from the mobile device through the security service. The method can further include, prior to the causing, requiring the mobile device to install and launch an application, wherein registration with the security service requires the application, and wherein the validation check is performed via the application and a fake check service. The application can provide metadata related to the device to the fake check service, and the fake check service performs the validation check providing a result of either successful validation or unsuccessful validation to the application. Preventing the traffic can further include causing a lockdown of the mobile device by the application or turning off a network interface by the application. The method can further include performing inline monitoring by the security service prior to allowing the traffic; and one of allowing and blocking the traffic based on the inline monitoring. The method can further include preventing the traffic by dropping the traffic at the security service which is configured for inline monitoring of the mobile device. The security service can be implemented at a Virtual Private Networking (VPN) server or service that provides access to resources.

In another embodiment, a system includes a network interface communicatively coupled to a mobile device; a processor communicatively coupled to the network interface; and memory storing computer-executable instructions that, when executed, cause the processor to cause the mobile device to perform a validation check to determine if the mobile device is any of fake, counterfeit, jailbroken, and rooted; responsive to successful validation, allow traffic to and from the mobile device through the security service; and, responsive to unsuccessful validation, prevent traffic to and from the mobile device through the security service.

In a further embodiment, a non-transitory computer-readable storage medium has computer readable code stored thereon for programming a processor to perform steps of, in a cloud node executing a security service, causing a mobile device to perform a validation check to determine if the mobile device is any of fake, counterfeit, jailbroken, and rooted; responsive to successful validation, allowing traffic to and from the mobile device through the security service; and, responsive to unsuccessful validation, preventing traffic to and from the mobile device through the security service.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

FIG. 3 is a block diagram of a mobile device which may be used in the cloud-based system of FIG. 1 or the like;

DETAILED DESCRIPTION OF THE DISCLOSURE

The present disclosure relates to systems and methods for quarantining fake mobile devices in the cloud. The terms "counterfeit" and "fake" are used interchangeably herein to refer to a mobile device that should not have network access, i.e., quarantine. Further, the term mobile device can include, without limitation, a smartphone, a tablet, a smartwatch, an Internet of Things (IoT) device, a laptop, etc. Even further, a fake mobile device may include a jailbroken (Apple) or rooted (Android) mobile device. The present disclosure provides network protection by preventing fake, counterfeit, jailbroken, and/or rooted mobile devices from network access. Of course, these devices may be harmless, but the present disclosure assumes, in a secure environment, the best practice is to prevent such devices from network connectivity. That is, the present disclosure presumes that such devices are more prone to spread malware. The present disclosure provides early detection and prevention from the cloud, a VPN server, a load balancer, a firewall, or the like. In addition, the present disclosure can leverage a security cloud to communicate detection including detection of a pattern of different type of attacks.

Example Cloud System Architecture

Figure 1:
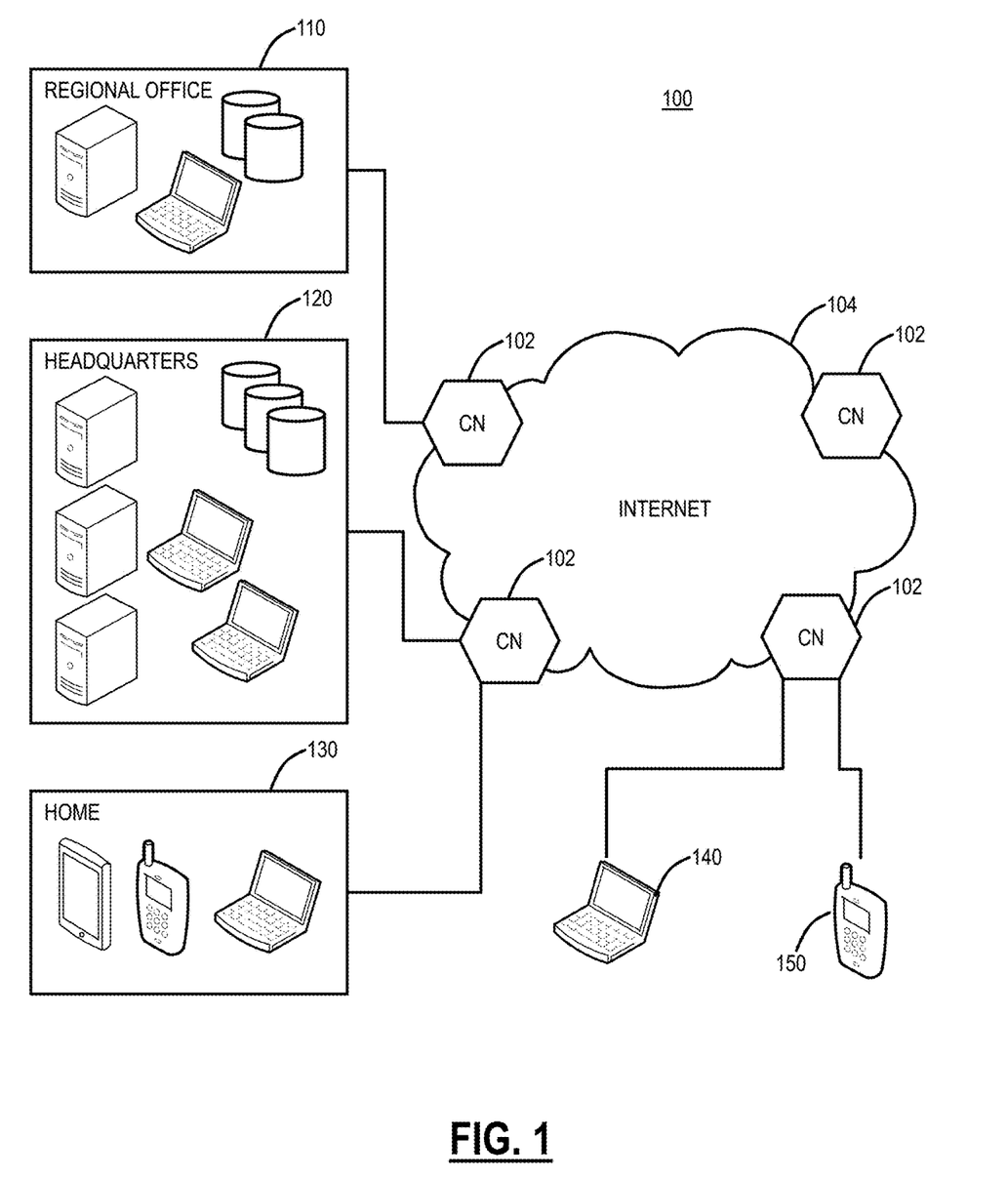
FIG. 1 is a network diagram of a cloud-based system for implementing various cloud-based service functions.
Figure 2:
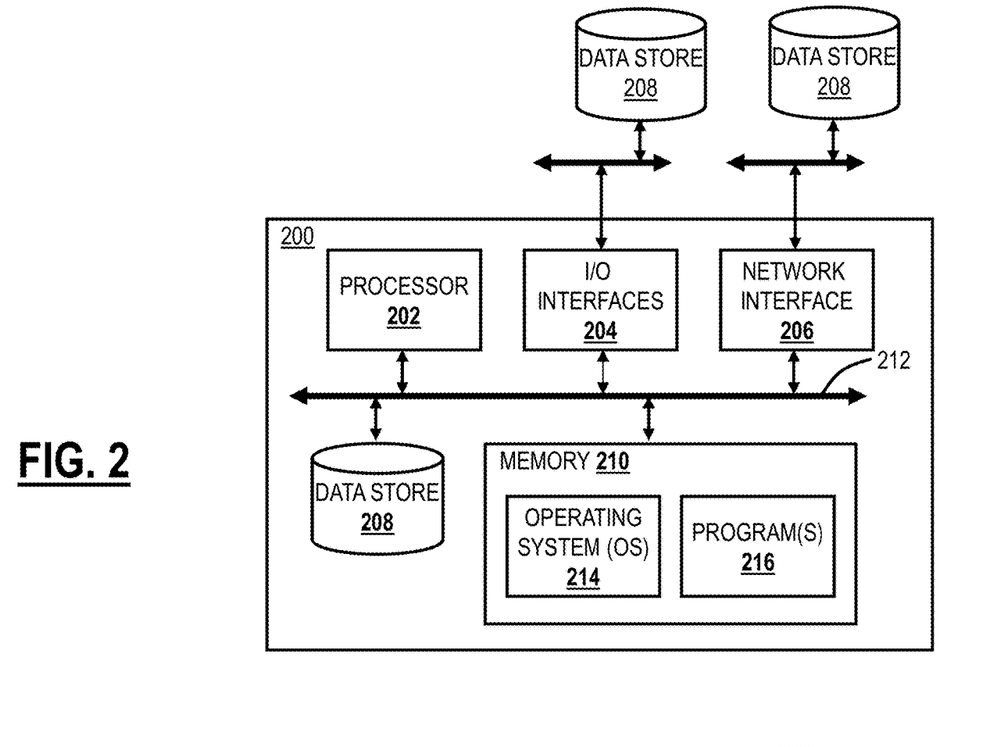

FIG. 1 is a network diagram of a cloud-based system 100 for implementing various cloud-based service functions. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee of the present application). The IA service can include firewall, threat prevention, Deep Packet Inspection (DPI), Data Leakage Prevention (DLP), and the like. The PA can include access control, micro service segmentation, etc. For example, the IA service can provide a user with Internet Access and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, bandwidth control, DLP, zero-day vulnerability protection, web 2.0 features, and the like. In an embodiment, the cloud-based system 100 may be viewed as Security-as-a-Service through the cloud, such as the IA.

Figure 3:
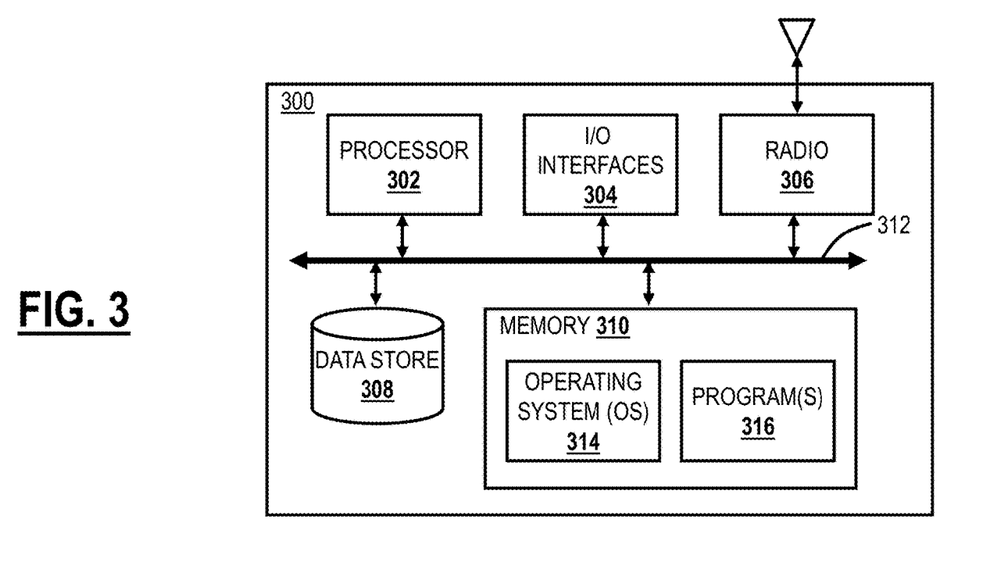

In an embodiment, the cloud-based system 100 can be configured to provide mobile device security and policy systems and methods. The mobile device 150 may be a mobile device 200 (as illustrated in FIG. 3) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

Example Server Architecture

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example Mobile Device Architecture

FIG. 3 is a block diagram of a mobile device 300, which may be used in the cloud-based system 100 or the like. Again, the mobile device 300 can be a smartphone, a tablet, a smartwatch, an Internet of Things (IoT) device, a laptop, etc. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs, and provides scheduling, input-output control, file and data management, memory management, and communication control and related services. The programs 316 may include various applications, add-ons, etc. configured to provide end-user functionality with the mobile device 300. For example, example programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

As described herein, the present disclosure seeks to detect and quarantine a mobile device 300 that is either fake, counterfeit, jailbroken, or rooted. A fake or counterfeit mobile device 300 is one that has a form factor and the O/S 314 that appears authentic. For example, the fake or counterfeit mobile device 300 can be physically indistinguishable from a real device. However, the processor 302 and other components may be lower cost or older generation components. Disadvantageously, the fake or counterfeit mobile device 300 can include preloaded malware including keyloggers, Distributed Denial of Service (DDoS) hosts, ransomware, ads, etc. For example, the fake or counterfeit mobile device 300 can be quiet for a while and then reach out to a command-and-control network for instructions. The ransomware can be used to lock down access to email, files, photos, etc. Typically, the fake or counterfeit mobile device 300 operates an older version of the O/S 314.

A rooted mobile device 300 is one with the Android O/S 314 that has root access. Here, a user has privileges to modify the software code on the device or install other software that the manufacturer would not normally allow. Similarly, a jailbroken mobile device 300 is one with the iOS (Apple) 314 that is similar to a rooted mobile device 300.

Unified Agent Application

Figure 4:
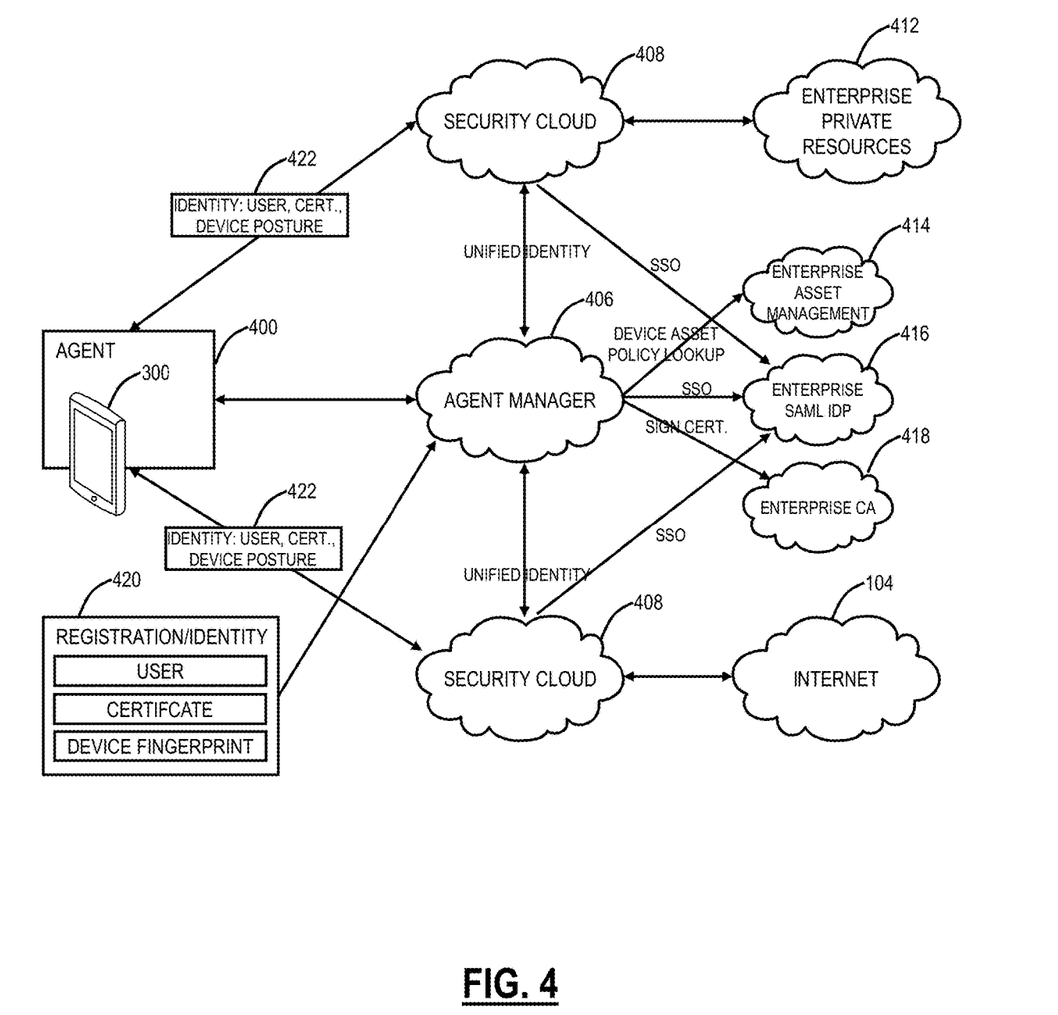
FIG. 4 is a network diagram of a unified agent application and associated connectivity and functionality.

FIG. 4 is a network diagram of a unified agent application 400 and associated connectivity and functionality. The unified agent application 400 is executed on a mobile device 300. The unified agent application 400 dynamically learns all available services, adapts to changing network environments, and provides a seamless and secure network resource access to Internet and darknet hosted applications. This is achieved through dynamic evaluation of network conditions, enrollment to individual services, learning individual service protocols, creating a link-local network on the device 300, and establishing multiple secure tunnels to cloud services over this local network.

The unified agent application 400 is communicatively coupled to an agent manager cloud 406, and a security cloud 408. Note, the security cloud 408 can be implemented in the cloud-based system 100, etc. The unified agent application 400 enables communication to enterprise private resources 412 via the security cloud 408 and to the Internet 104 via the security cloud 408. The agent manager cloud 406 can communicate with enterprise asset management 414, an enterprise Security Assertion Markup Language (SAML) Identity provider (IDP) 416, and an enterprise Certificate Authority (CA) 418. The device 300 and the unified agent application 300 can perform a registration/identity 320 process through the agent manager cloud 306 where the user identity, the user's certificates, and a device fingerprint can uniquely identify the device 300. Once registered, the unified agent application 300 has an identity 322 which can include the user, certificates, device posture, etc. and which is shared with the security cloud 308.

The unified agent application 300 operates on a client-server model where an Information Technology (IT) admin enables appropriate services for end users at a Cloud Administration Server (CAS) which can be part of an agent manager cloud 406, namely the enterprise asset management 414. Every client can make a unicast request to the agent manager cloud 406 (e.g., CAS) to discover all enabled services. On acknowledging the response, the client issues a request to authenticate to each service's cloud Identity Providers, the enterprise SAML IDP 416. Authentication can be multi-factor depending upon the nature of the service. On successful authentication, server contacts Mobile Device Management (MDM) or Inventory management provider to define access control rights for the device 300. Post authorization, the device 300 is successfully enrolled into the agent manager cloud 406 which tracks and monitors all behavior of the device 300.

Post-enrollment, the device 300 creates a link-local network with a specific Internet Protocol (IP) configuration, opens a virtual network interface to read and write packets and opens multiple listening sockets at custom ports to create secure tunnels to available services through the security cloud 408. On network changes, the device 300 dynamically evaluates reachability to preconfigured domains and depending upon the result it appropriately transitions all network tunnels, thus providing a seamless experience to the end user. Further, the device 300 also intelligently learns the conditions which are appropriate for setting up network tunnels to cloud services depending upon several network heuristics such as reachability to a particular cloud service.

Unified Agent Application—Functionality

The unified agent application 400 enable a user to connect to multiple cloud services through the dynamic discovery of available services followed by authentication and access as exposed in the corresponding service protocol. The unified agent application 400 addressed the unmanageable growth of mobility and cloud-based services which have led to a proliferation of individual applications for access to individual services. The unified agent application 400 can be implemented through a mobile application ("app") which overcomes the hassle of deploying and managing several applications across a gamut of mobile devices, operating systems, and mobile networks to gain secure access to the cloud-based internet or intranet resources. The mobile application can uniquely perform a Dynamic evaluation of Network and Service Discovery, Unified Enrollment to all services, Application dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end user, followed by authentication and access to individual services. Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user to all of those services. It will then set up secure tunnels for each application depending upon whether the application is internet bound or if it is internal to the corporate network (intranet).

The mobile app will also discover all applications provided within the enterprise cloud along with a Global Virtual Private Network (GVPN) service and show the available services to end user. Endpoint Applications today provide one service for a specific network function (such as Virtual Private Network (VPN) to a corporate network, web security, antivirus to access the Internet). The mobile app can be used to enable all these services with single enrollment. The mobile app will provide services to darknet applications along with securing the Internet traffic. The mobile app can set up a local network on the mobile device.

Generally, the unified agent application 400 support two broad functional categories—1) dynamic service discovery and access controls and 2) service availability. The dynamic service discovery and access controls include service configuration by the administrator, service discovery by the device 300, service acknowledgment and authentication, service authorization and enrollment, and the like. For service configuration by the administrator, the IT admin can provide cloud service details at a centralized knowledge server, such as part of the agent manager cloud 406, the enterprise asset management 414, etc. The cloud service details include the service type (e.g., Internet/intranet), network protocol, identity provider, server address, port, and access controls, etc.

For service discovery by the device 300, the device 300 can issue a network request to a known Cloud Administrative Server (CAS) in the agent manager cloud 406 to discover all enabled services for a user. If a specific cloud server is not known a priori, the device 404 can broadcast the request to multiple clouds, e.g., through the agent manager cloud 406 communicating to the enterprise asset management 414, the enterprise SAML IDP 416, and the enterprise CA 418.

For the service acknowledgment and authentication, the device 300 acknowledges the response of service discovery and initiates the authentication flow. The device 300 learns the authentication protocol through the service discovery configuration and performs authentication of a configured nature at the enterprise SAML IDP 416. For the service authorization and enrollment, post successful authentication, the CAS, authorizes the device 604 and fetches the access control information by contacting an MDM/Inventory Solutions Provider. Depending upon the user context and the nature of access, the CAS enrolls the device 300 into several cloud services and informs the cloud services that the user has been enrolled for access.

The service availability includes link-local network setup, a traffic interceptor, and dynamic traffic forwarding tunnels to authorized services. The link-local network setup, post-enrollment, has the device 300 create a local network on the device 300 itself to manage various networking functionalities. For the traffic interceptor, the device 300 intercepts and evaluates all Internet traffic. Allowed traffic is tunneled to the cloud services such as in the security cloud 408 whereas the rest of the traffic is denied as per enterprise policies. For the dynamic traffic forwarding tunnels to authorized services, depending upon the evaluation, the device 300 splits the traffic into the different tunnel to individual cloud services such as in the security cloud 408.

The unified agent application 400 is a single application that provides secure connectivity to the Internet 104 and darknet hosted applications, such as the private enterprise resources 412. The unified agent application 400 communicates securely to the agent manager 406 which is controlled by an IT admin. The unified agent application 400 learns available services and authenticates with each service. Post proper enrollment, the unified agent application 400 securely connects to cloud services by means of network tunnels.

Mobile Device Detection Via the Unified Agent Application

In an embodiment, the unified agent application 400 is utilized on mobile devices 300 in addition to cloud-based services via the cloud-based system 100 or the like. For example, the cloud-based services can include IA (e.g., ZIA)

or PA (e.g., ZPA). The unified agent application 400 in conjunction with the cloud-based services can use various counterfeit device detection integrations using to protect enterprise customers that subscribe to this security service.

With the intelligence built in the unified agent application 400 for network traffic control, the security services provided by the IA, the private access control through PA, customers can take various actions responsive to detecting counterfeit devices. For example, the actions may include complete quarantine of the device 300, limiting access to various resources, track the device 300 and identify/remedy any malicious activities, etc. Accordingly, the cloud-based system 100 operating services such as IA or PA can be used in addition to the unified agent application 400 to mitigate/remediate/quarantine/etc.

Figure 5:
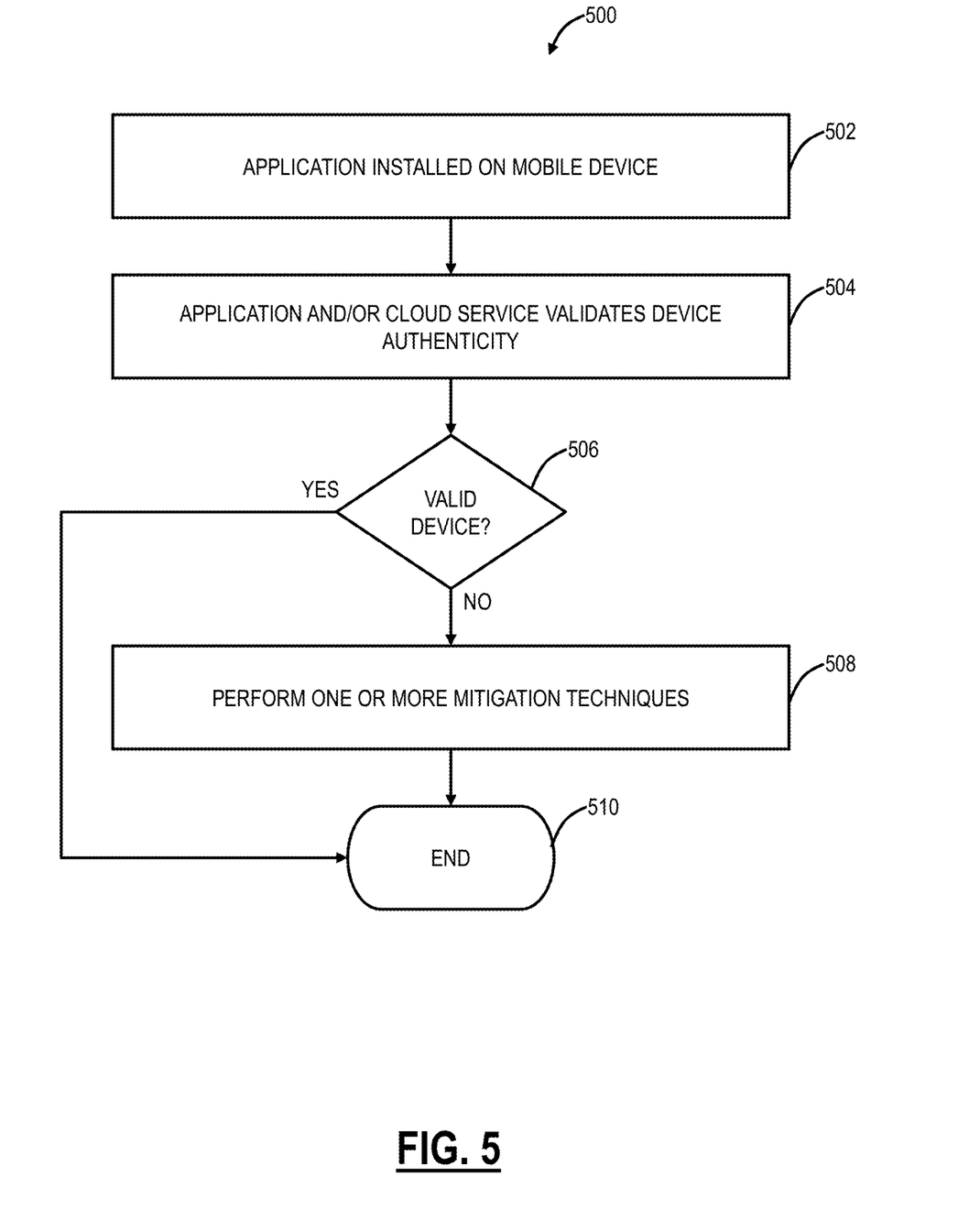
FIG. 5 is a flowchart of a valid mobile device detection process.

FIG. 5 is a flowchart of a valid mobile device detection process 500. The process 500 includes the application 400 being installed on the mobile device 300 (step 502). Note, in a typical case, a user associated with the mobile device 300 may not be aware that a particular mobile device 300 is counterfeit or fake. It is likely the user would be aware of the mobile device 300 is rooted or jailbroken. Also, the user may be unaware of the valid mobile device detection process 500 as it is performed in the cloud or the like. In an embodiment, this installation step can be mandatory for the mobile device 300 if the mobile device 300 is used in conjunction with an enterprise. For example, access to the enterprise private resources 412 can be prevented unless a mobile device 300 has the application 400. An example of the application 400 can include the Zscaler application ("Zapp") available from the Applicant, Zscaler, Inc.

The application 400 can be launched on the device 300. The process 500 includes the application 4000 and/or a cloud service validating the mobile device authenticity (step 504). The present disclosure contemplates various validation approaches including third-party integrations (e.g., from Google, Affilias, etc.). In an embodiment, the application 400 can provide information (metadata) related to the mobile device 300 to the cloud service which determines authenticity and provides a result to the application 400. Also, the cloud service can poll the application 400 for the information. In another embodiment, the application 400 can locally perform a determination and optionally rely on the cloud service if there is uncertainty.

The general approach to determine authenticity is to provide hardware and/or software details of the mobile device 300. For example, a global device registry can be used to validate information such as International Mobile Equipment Identity (IMEI), International Mobile Subscriber Identity (IMSI), Mobile Station International Subscriber Directory Number (MSISDN), the owner, device, carrier, purchase time, date, and location. Another approach may include querying hardware specifications and performing a comparison against expectations in a database. For example, fake or counterfeit devices typically have older generation hardware than expected. Various other approaches are also contemplated. In another embodiment, authenticity can further include the fact the mobile device 300 is neither jailbroken (iOS) or rooted (Android).

The process 500 can receive an indication of validity (step 506). Here, the cloud service can return a success (the device 300 is valid) or failure (the device 300 is not valid, meaning one or more of fake, counterfeit, jailbroken, or rooted). The process 500 can include one or more mitigation techniques if the device 300 is not valid (step 508) and the process 500 can end (510). If the device 300 is valid (step 506), the process 500 can end (step 510).

The mitigation techniques can include a notification to the user, notification to another device such as a VPN server, firewall, load balancer, etc., a lockdown of the mobile device 300 by the application 400, a lockdown of the network interface on the mobile device 300 by the application 400, prevention of access to specific resources including enterprise resources, the Internet, etc. That is, the application 400 can support various actions (mitigation techniques) responsive to determining an invalid device 300.

Example Operation

Figure 6:
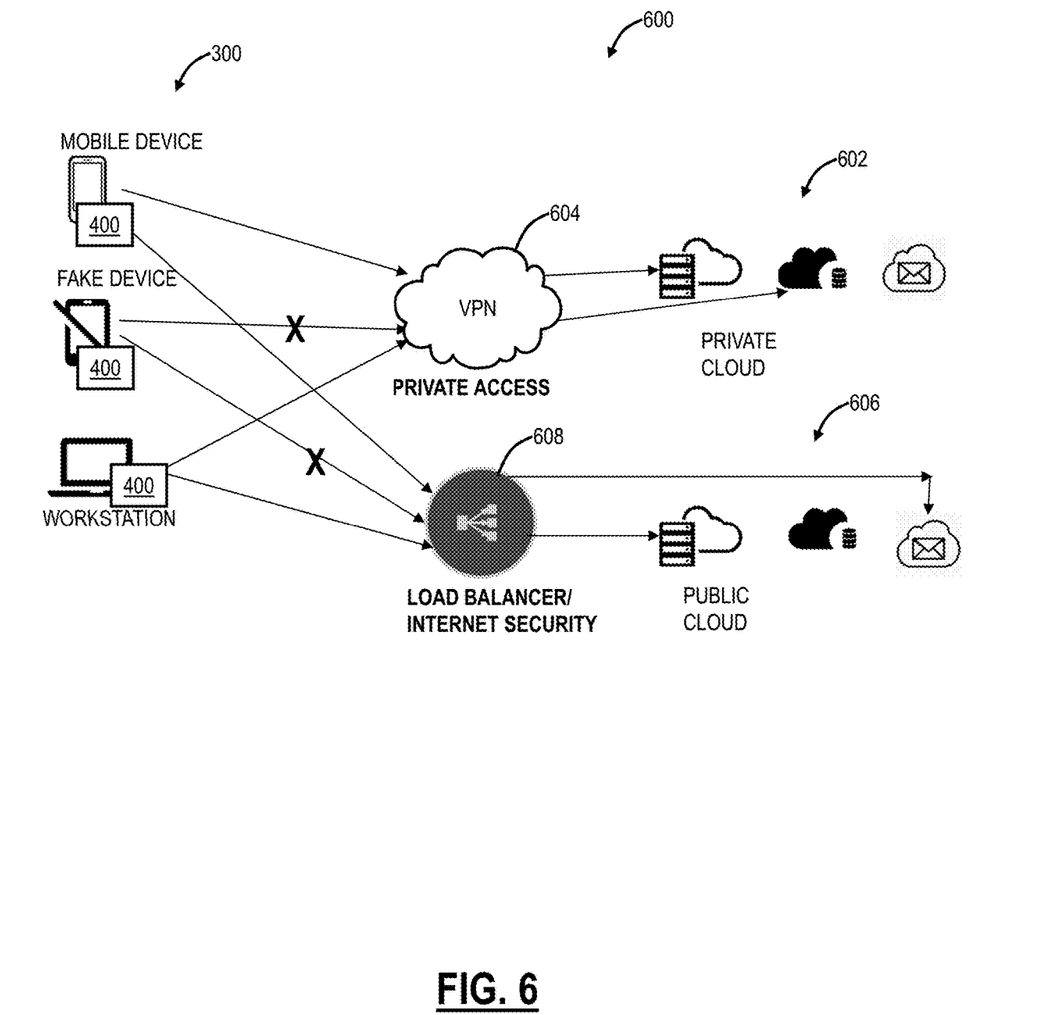
FIG. 6 is a network diagram of a network illustrating various mobile devices with the application for detecting validity.
Figure 7:
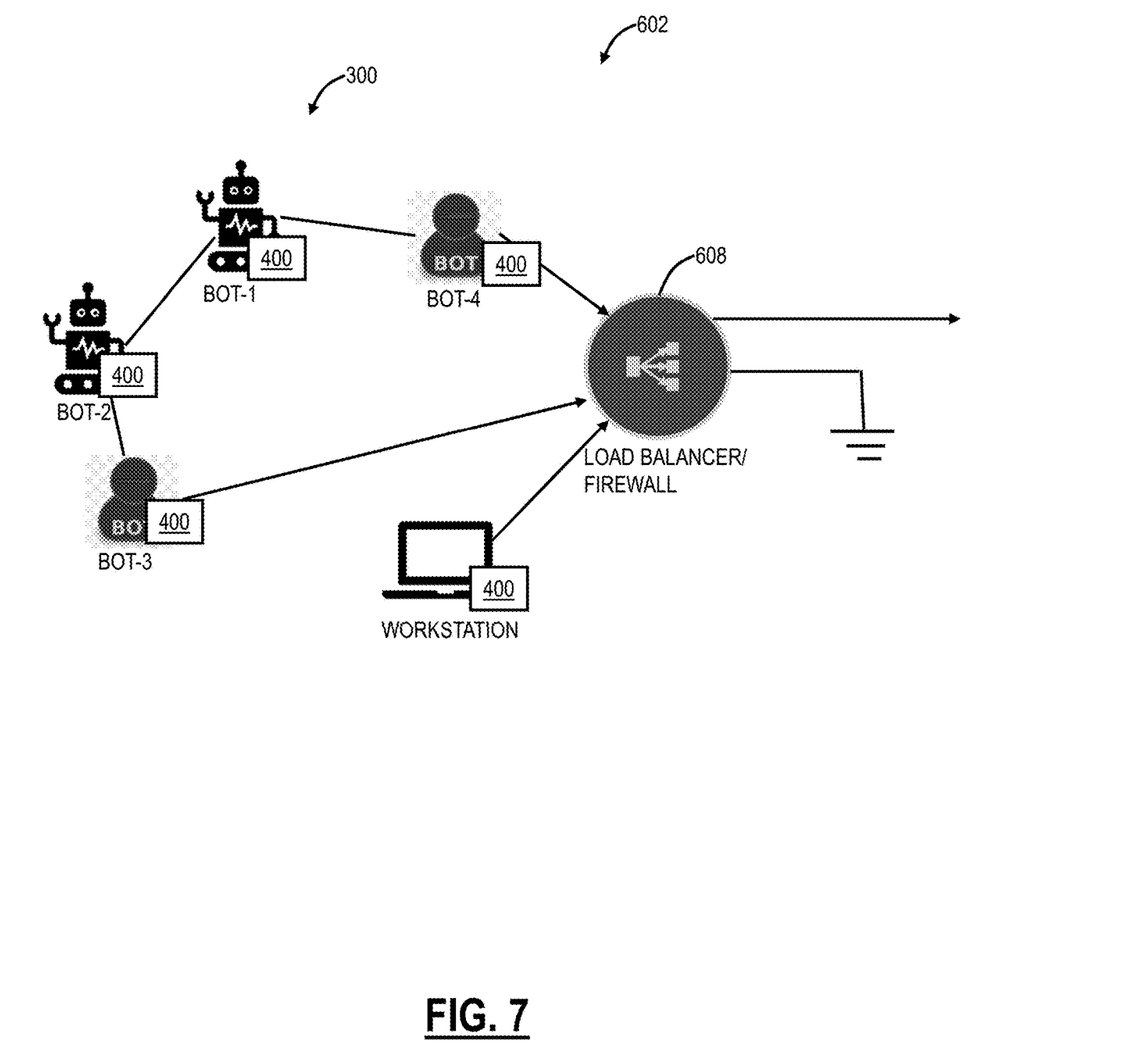
FIG. 7 is a network diagram of a network illustrating various IoT devices with the application for detecting validity.

FIG. 6 is a network diagram of a network 600 illustrating various mobile devices 300 with the application 400 for detecting validity. FIG. 7 is a network diagram of a network 602 illustrating various IoT devices 300 with the application 400 for detecting validity. The present disclosure adds a security layer while securing network traffic specifically detecting traffic originating from devices 300 which are fake/counterfeit/jailbroken/rooted. In FIG. 7, counterfeit devices 300 might be one which is either a bot, software mimicking as an actual device which has a lot more control of creating actions which can be taken and would not be possible on actual devices, i.e., creating spam, trojans, and other dangerous programs.

In FIG. 6, the devices 300 include the application 400 and can connect to a private cloud 602 via a VPN 604 or the like and to a public cloud 606 via a device 608 such as a load balancer, an Internet Security appliance, a firewall, etc. The VPN 604 and/or the device 608 can be configured to require the application 400 on the devices 300 for access and to implement the process 500 prior to access. The VPN 604 can be a server that provides access to the private cloud 602, e.g., enterprise resources. The VPN 604 can also be the Zscaler Private Access (ZPA) service available from the Applicant, Zscaler, Inc. The device 608 can be an endpoint appliance as well as a cloud-based service such as Zscaler Internet Access (ZIA), again, available from Zscaler, Inc.

While making network connection through the VPN 604, the device 608, etc., the process 500 can be used to detect if the connection is being made by a device 300 which is counterfeit or its security has been compromised (jailbroken/rooted). There are several software packages and services which are able to detect if the device 300 is authentic, fake, or compromised with security. For example, the cloud service in the process 500 can operate with the VPN 604, the device 608, etc. When a device 300 is not authentic, the VPN 604 and/or the device 608 can be informed and configured to block access by that device 300.

The device 300 identification can be via several parameters which assures the correct device is being rejected, e.g., either its originating IP address, Media Access Control (MAC) address, or some other unique identifier attribute.

In FIG. 7, there are various bots—communication established across devices 300 which are actually not devices rather bots, not if they start behaving like devices and has the agent for accessing Enterprise network just for connectivity, it could be detrimental if that bot has malware. The process 500 can keep these bots from mimicking actual devices 300 and accessing a network such as via the device 608.

Call Flow

Figure 8:
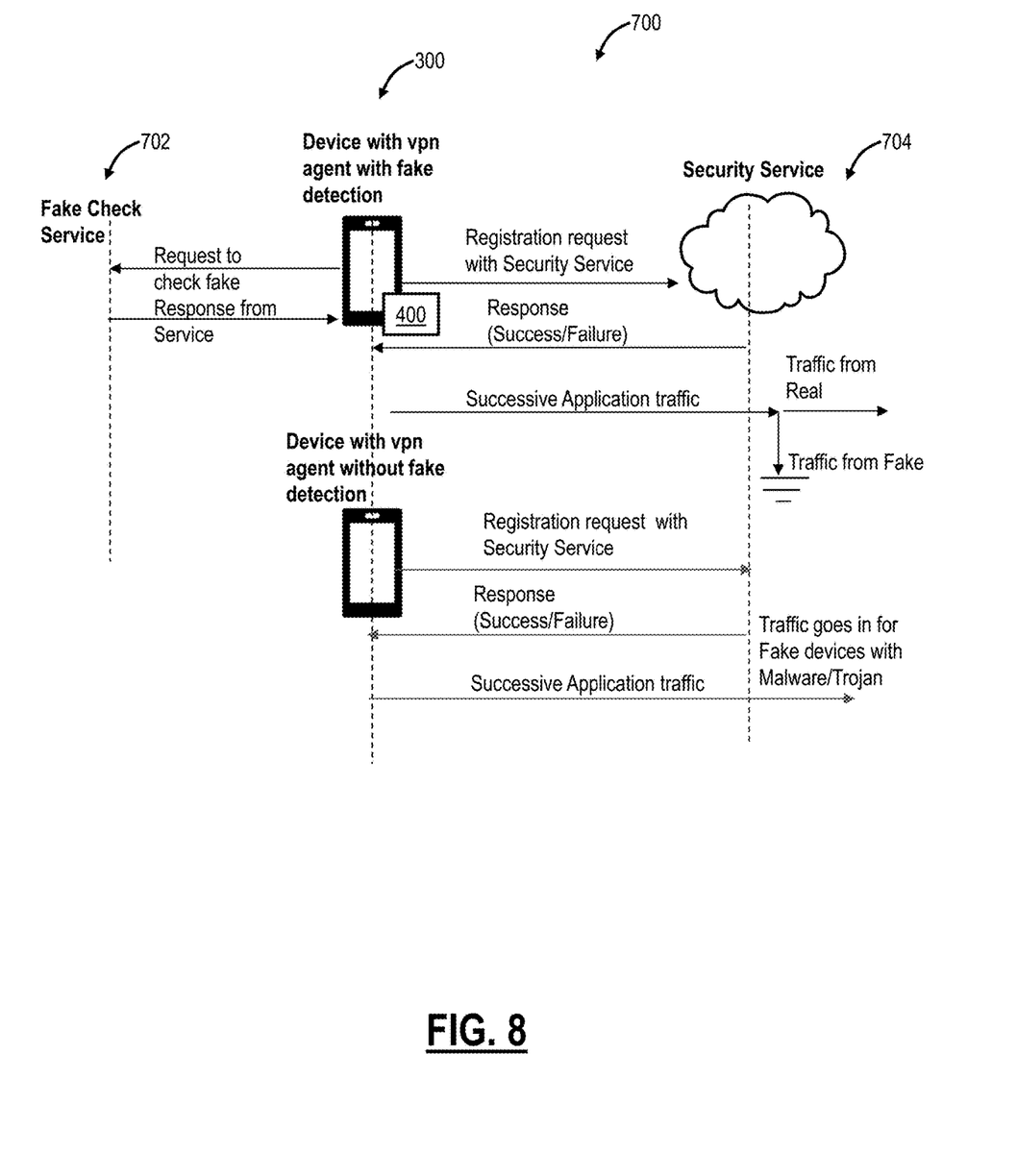
FIG. 8 is a flow diagram of a call flow between a mobile device, a fake check service, and a security service.

FIG. 8 is a flow diagram of call flow 700 between a mobile device 300, a fake check service 702, and a security service 704. In this embodiment, the fake check service 702 can be the cloud service in the process 500. This can be hosted in the VPN 604, in the device 608, in the cloud-based system 100, etc. The security service 704 can be the VPN 604, the device 608, the cloud-based system 100, etc. In an embodiment, the fake check service 702 and the security service 704 are separate. In another embodiment, the fake check service 702 and the security service 704 can be hosted together—either in the same physical system or part of the same service. The fake check service 702 is configured to determine the validity of the mobile device 300. The security service 704 is configured to perform inline monitoring including blocking and/or allowing access to resources.

The fake check service 702 can operate in conjunction with the application 400. Again, the security service 704 can automatically prevent access with any mobile device 300 that does not have the application 400. Once the application 400 is installed and launched, the application 400 can operate with the fake check service 702 to determine validity. For example, the application 400 can make a request to the fake check service 702 with metadata related to the device 300 and receive a response from the fake check service 702. The request to the fake check service 702 can be responsive to a registration request with the security service 704. For example, as part of the registration with the security service 704, the security service 704 can request the application 400 check the validity of the mobile device 300.

With a successful validation, credentials can be provided from the fake check service 702 to the device 300 which is then provided to the security service 704 allowing traffic to flow. For the mitigation techniques, in an embodiment, the security service 704 can be configured to blackhole or drop traffic from a fake mobile device 300 while allowing traffic from a real mobile device 300 to pass.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
in a cloud node executing a security service, causing a mobile device, via an application, to perform a validation check to determine if the mobile device is any of fake, counterfeit, jailbroken, and rooted, wherein the determining is done based on hardware and/or software details, wherein prior to the causing, the application is installed and launched on the mobile device, wherein the mobile device can be one of a smartphone, a tablet, a smartwatch, a laptop, and an Internet of Things (IoT) device, wherein registration with the security service requires the application, and wherein the validation check is performed, responsive to the registration, via the application and a fake check service that is separate from the security service;
responsive to the validation check being successful, receiving validation credentials, at the cloud node from the mobile device, that validate the mobile device, to the cloud node, as not being any of fake, counterfeit, jailbroken, and rooted, the validation credentials being generated by the fake check service, wherein the validation credentials are provided to the mobile device from the fake check service and then provided to the security service upon the validation check being successful;
responsive to the receiving of the validation credentials at the cloud node, allowing traffic to and from the mobile device through the security service; and
responsive to the validation being unsuccessful and not receiving the validation credentials at the cloud node, preventing or limiting traffic to and from the mobile device, tracking the mobile device, and identifying and remedying any malicious activities through the security service.

2. The method of claim 1, wherein the application provides metadata related to the device and hardware and/or software details of the device to the fake check service and the fake check service performs the validation check providing a result of either successful validation or unsuccessful validation to the application, wherein a global device registry and hardware expectation database is used to validate information.

3. The method of claim 1, wherein preventing the traffic further includes causing a lockdown of the mobile device by the application or turning off a network interface by the application.

4. The method of claim 1, further comprising:
performing inline monitoring by the security service prior to allowing the traffic; and one of allowing and blocking the traffic based on the inline monitoring.

5. The method of claim 1, further comprising:
preventing the traffic by dropping the traffic at the security service which is configured for inline monitoring of the mobile device.

6. The method of claim 1, wherein the security service is implemented at a Virtual Private Networking (VPN) server or service that provides access to resources.

7. A system comprising:
a network interface communicatively coupled to a mobile device;
a processor communicatively coupled to the network interface; and
memory storing computer-executable instructions that, when executed, cause the processor to:
cause the mobile device, via an application, to perform a validation check to determine if the mobile device is any of fake, counterfeit, jailbroken, and rooted, wherein the determining is done based on hardware and/or software details, wherein prior to the validation check, the application is installed and launched on the mobile device, wherein the mobile device can be one of a smartphone, a tablet, a smartwatch, a laptop, and an Internet of Things (IoT) device, wherein registration with a security service requires the application, and wherein the validation check is performed, responsive to the registration, via the application and a fake check service that is separate from the security service;
responsive to the validation check being successful, receiving validation credentials from the mobile device that validate the mobile device, to the system, as not being any of fake, counterfeit, jailbroken, and rooted, the validation credentials being generated by the fake check service, wherein the validation credentials are provided to the mobile device from the fake check service and then provided to the security service upon the validation check being successful;
responsive to the receiving of the validation credentials, allow traffic to and from the mobile device through the security service; and
responsive to the validation being unsuccessful and not receiving the validation credentials at the system, prevent or limiting traffic to and from the mobile device, tracking the mobile device, and identifying and remedying any malicious activities through the security service.

8. The system of claim 7, wherein the application provides metadata related to the device and hardware and/or software details of the device to the fake check service and the fake check service performs the validation check providing a result of either successful validation or unsuccessful validation to the application, wherein a global device registry and hardware expectation database is used to validate information.

9. The system of claim 7, wherein the traffic is prevented by causing a lockdown of the mobile device by the application or by turning off a network interface by the application.

10. The system of claim 7, wherein the memory storing computer-executable instructions that, when executed, further cause the processor to:
perform inline monitoring by the security service prior to allowing the traffic; and
one of allow and block the traffic based on the inline monitoring.

11. The system of claim 7, wherein the memory storing computer-executable instructions that, when executed, further cause the processor to:
preventing the traffic by dropping the traffic at the security service which is configured for inline monitoring of the mobile device.

12. The system of claim 7, wherein the system is a Virtual Private Networking (VPN) server or service that provides access to resources.

13. A non-transitory computer-readable storage medium having computer readable code stored thereon for programming a processor to perform steps of:
in a cloud node executing a security service, causing a mobile device, via an application, to perform a validation check to determine if the mobile device is any of fake, counterfeit, jailbroken, and rooted, wherein the determining is done based on hardware and/or software details, wherein prior to the causing, the application is installed and launched on the mobile device, wherein the mobile device can be one of a smartphone, a tablet, a smartwatch, a laptop, and an Internet of Things (IoT) device, wherein registration with the security service requires the application, and wherein the validation check is performed, responsive to the registration, via the application and a fake check service that is separate from the security service;
responsive to the validation check being successful, receiving validation credentials, at the cloud node from the mobile device, that validate the mobile device, to the cloud node, as not being any of fake, counterfeit, jailbroken, and rooted, the validation credentials being generated by the fake check service, wherein the validation credentials are provided to the mobile device from the fake check service and then provided to the security service upon the validation check being successful;
responsive to the receiving of the validation credentials, allowing traffic to and from the mobile device through the security service; and
responsive to the validation being unsuccessful and not receiving the validation credentials at the cloud node, preventing or limiting traffic to and from the mobile device, tracking the mobile device, and identifying and remedying any malicious activities through the security service.

14. The non-transitory computer-readable storage medium of claim 13, wherein the application provides metadata related to the device and hardware and/or software details of the device to the fake check service and the fake check service performs the validation check providing a result of either successful validation or unsuccessful validation to the application, wherein a global device registry and hardware expectation database is used to validate information.

15. The non-transitory computer-readable storage medium of claim 13, wherein preventing the traffic further includes causing a lockdown of the mobile device by the application or turning off a network interface by the application.

16. The non-transitory computer-readable storage medium of claim 13, wherein the steps further include:
performing inline monitoring by the security service prior to allowing the traffic; and
one of allowing and blocking the traffic based on the inline monitoring.

17. The non-transitory computer-readable storage medium of claim 13, wherein the steps further include:

preventing the traffic by dropping the traffic at the security service which is configured for inline monitoring of the mobile device.

18. The method of claim 2, wherein the fake check service is configured to check the hardware details against expectations in a database.

19. The method of claim 2, wherein the fake check service is configured to check the hardware and/or software details against a global device registry.

20. The method of claim 19, wherein the global device registry includes information comprising any of International Mobile Equipment Identity (IMEI), International Mobile Subscriber Identity (IMSI), Mobile Station International Subscriber Directory Number (MSISDN), the owner, device, carrier, purchase time, date, and location.

* * * * *